Figure 1:
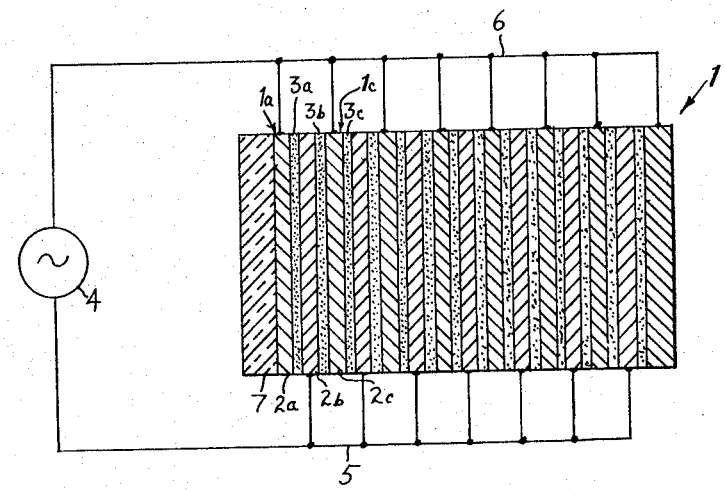

Jan. 17, 1967 KIYOSHI INOUE 3,299,307
ELECTROLUMINESCENT MULTILAYER STOCK WITH IN SITU FORMATION
OF ACTIVE LAYER AND METHOD OF MAKING SAME
Filed Jan. 13, 1964

KIYOSHI INOUE
INVENTOR.

BY

AGENT

3,299,307
ELECTROLUMINESCENT MULTILAYER STACK WITH IN SITU FORMATION OF ACTIVE LAYER AND METHOD OF MAKING SAME
Kiyoshi Inoue, 182 3-chome, Tokyo, Japan
Filed Jan. 13, 1964, Ser. No. 337,483
Claims priority, application Japan, Jan. 14, 1963, 38/1,725
12 Claims. (Cl. 313—108)

My present invention relates to electroluminescent devices and, more particularly, to highly efficient electroluminescent bodies and a method of making same.

Electroluminescent bodies have been produced heretofore by depositing an electroluminescent material, such as zinc sulfide (activated with copper, silver etc.), upon a conductive layer which is translucent to the wave length of the emitted light, a further conductive layer being juxtaposed with the layer of electroluminescent material. In order to insure a substantially homogeneous and uniform emission of illumination over the entire surface of the body, special care must be taken to deposit the electroluminescent layer uniformly and in manufacturing the translucent conductive layer. Suitable conductive layers, proposed heretofore, are aluminum, tin and their oxides in sufficiently thin strips as to be translucent as previously indicated.

It is the principal object of the present invention to provide an improved electroluminescent body of the general type described above, which has a high light output per unit of electrical energy consumed and which obtains maximum luminescent effectiveness from the active material.

A further object of this invention is to provide an improved method of making such bodies.

The foregoing objects, and others which will become apparent hereinafter, are attained in accordance with the present invention by forming an electroluminescent body consisting of a stack of conductive films having intervening layers of electroluminescent material formed by chemical reaction with these films along at least one surface thereof after production of each film, the electroluminescent material being activated by doping with a metal such as copper, silver or any other common doping agent, preferably by depositing a thin layer of the activating metal upon the electroluminescent layer.

Thus it is an essential feature of the present invention to carry out successive vapor deposition of a conductive material, generally a metal capable of undergoing chemical reaction to form an electroluminescent material; treating each layer or film upon formation with a substance adapted to react with the conductive material, thereby producing a layer of electroluminescent material upon a surface of the film; and thereupon depositing a further layer of conductive material upon the electroluminescent layer and carrying out alternate chemical reaction and deposition until a stack, preferably containing between 100 and 5000 electroluminescent layers is produced. More specifically, it may be noted that the doping of each electroluminescent layer, which can be formed by sulfurization of the previously deposited metallic film, can be effected by depositing a further layer or film of an activating metal, preferably copper or silver depending upon the color of the emitted illumination desired, upon each electroluminescent layer subsequent to formation or by carrying out a deposition of the activating metal concurrently with sulfurization.

I have discovered that, when the conductive films are composed of vapor-deposited layers of zinc, having a thickness ranging between substantially 2 and 25 microns, with a surface film of zinc sulfide produced by sulfurization of the zinc film of a fraction of a micron in thickness, relatively low voltages can be applied across the conductive films (i.e. as low as 10 volts in place of the 80 volts normally required) with light outputs ten times those obtained previously with ordinary electroluminescent bodies using a similar quantity of electroluminescent material.

Preferably, the activating film of silver or copper has a thickness ranging between 5 angstrom units and 1 micron with best results being obtained between the critical limits of 20 and 80 angstrom units. The conductive layers should have a thickness between substantially 2 and 25 microns and yield best results when this thickness is from 5 to 10 microns, efficiency falling off beyond these limits. The layer of electroluminescent material can have a thickness between 0.01 and 5 microns with effective results being obtained with electroluminescent layers having a thickness of a fraction of a micron (i.e. between 0.1 and 1 micron).

Figure 2:
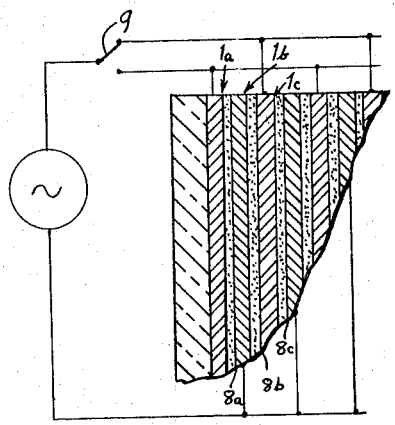

The above and other objects, features and advantages of the present invention will become more readily apparent from the following description and example, reference being made to the accompanying drawing in which:

FIG. 1 is an axial cross-sectional view through a cylindrical electroluminescent body consisting of a stack of electroluminescent layers according to the present invention; and FIG. 2 is a similar view illustrating a further embodiment of the present invention.

In FIG. 1 I show an electroluminescent body 1 containing successive layers 2a, 2b, 2c etc. of vapor-deposited zinc having surface layers 3a, 3b, 3c etc. of zinc sulfide formed by sulfurization of the zinc film; each conductive layer and electroluminescent layer forms a stratum 1a, 1b, 1c etc. Alternate conductive films are connected together by conductor networks 5 and 6 which are tied to the opposite poles of a source 4 of alternating current. The first zinc layer 1a is deposited upon a glass plate 7. The zinc sulfide layers of the device of FIG. 1 are doped by deposition of copper or silver upon the layers of electroluminescent material 3a, 3b, 3c etc.

The device of FIG. 2 is similar to that of FIG. 1 except that the unit lamella 1a–1c etc. thereof has alternating zinc sulfide layers provided with activating layer 8a–8c of copper or silver and connected in separate circuits for activation in accordance with the position of switch 9 to cause the device to emit different colors.

*Example*

The electroluminescent body of either of FIGS. 1 and 2 is produced by evaporating a film of zinc having a thickness between 5 and 10 microns upon a glass plate and then exposing this film to silver vapor for a period of five minutes to form a layer of zinc sulfide along a surface zone of the zinc film. The zinc sulfide layer is found to be a fraction of a micron in thickness. The zinc sulfide layer is activated by evaporating a thin film of copper upon it (thickness 45 angstrom units). A further zinc film is then deposited upon the zinc sulfide layer and the process repeated until a stack of 2000 layers has been produced.

Each pair of conductive layers is connected in parallel and 40 volts of 60-cycle alternating current is applied across them. The luminous output of the device was found to be ten times that of an electroluminescent body of similar dimensions produced by sandwiching activated zinc sulfide between two conductive films and applying 80 volts of 60-cycle alternating current thereacross. Similar results were obtained when the activating layer was silver and when alternate zinc sulfide layers were activated with copper and silver. The activation layer was found to have a critical range of thickness between 20 and 80 angstroms as previously indicated while a decrease in the luminous deficiency of the types was observed when the vacuum-deposited zinc layers had a thickness outside the range of 5–10 microns.

The invention as described and illustrated is believed to admit of many modifications and variations within the ability of persons skilled in the art, all such modifications and variations being deemed to be included within the spirit and scope of the appended claims.

What is claimed is:

1. A method of making an electroluminescent body, comprising the steps of:
   (a) depositing a conductive layer upon a substrate;
   (b) chemically converting at least part of said layer into an electroluminescent compound only after deposition in step (a) upon said substrate;
   (c) depositing a further conductive layer upon said electroluminescent compound and chemically converting at least part of said further layer after the deposition thereof into a further electroluminescent compound; and
   (d) repeating step (c) to form a stack of conductive layers with intervening layers of electroluminescent material.

2. A method of making an electroluminescent body, comprising the steps of:
   (a) depositing a conductive layer upon a substrate;
   (b) chemically converting at least part of said layer into an electroluminescent compound only after deposition in step (a) upon said substrate;
   (c) depositing a further conductive layer upon said electroluminescent compound and chemically converting at least part of said further layer after the deposition thereof into a further electroluminescent compound;
   (d) repeating step (c) to form a stack of conductive layers with intervening layers of electroluminescent material; and
   (e) providing said stack with terminals for applying an electric field across each pair of conductive layers sandwiching a respective layer of electroluminescent material between them.

3. A method of making an electroluminescent body, comprising the steps of:
   (a) depositing a conductive layer of a metal upon a substrate;
   (b) chemically converting part of said layer into an electroluminescent compound by sulfurizing the surface of said layer only after deposition in step (a) upon said substrate;
   (c) depositing a further conductive layer of said metal upon said electroluminescent compound and chemically converting part of said further layer after the deposition thereof into a further electroluminescent compound by sulfurizing the surface of said further layer;
   (d) repeating step (c) to form a stack of conductive layers with intervening layers of electroluminescent material; and
   (e) providing said stack with terminals for applying an electric field across each pair of conductive layers sandwiching a respective layer of electroluminescent material between them.

4. A method of making an electroluminescent body, comprising the steps of:
   (a) evaporating a conductive film of a metal upon a substrate;
   (b) chemically converting part of said film into an electroluminescent compound by sulfurizing the surface of said film only after deposition in step (a) upon said substrate;
   (c) evaporating a further conductive film of said metal upon said electroluminescent compound and chemically converting part of said further film after the deposition thereof into a further electroluminescent compound by sulfurizing the surface of said further film;
   (d) repeating step (c) to form a stack of conductive films with intervening layers of electroluminescent material; and
   (e) providing said stack with terminals for applying an electric field across each pair of conductive films sandwiching a respective layer of electroluminescent material between them.

5. A method of making an electroluminescent body, comprising the steps of:
   (a) evaporating a conductive film of a metal upon a substrate;
   (b) chemically converting part of the film deposited in step (a) into an electroluminescent compound by sulfurizing the surface of said film; and depositing upon said compound a metal layer selected from the group which consists of silver and copper;
   (c) evaporating a further conductive film of said metal upon said electroluminescent compound and chemically converting part of said further film into a further electroluminescent compound by sulfurizing the surface of said further film and depositing upon said further compound a metal layer selected from the group which consists of silver and copper;
   (d) repeating step (c) to form a stack of conductive films with intervening layers of electroluminescent material; and
   (e) providing said stack with terminals for applying an electric field across each pair of conductive films sandwiching a respective layer of electroluminescent material between them.

6. A method as defined in claim 5 wherein said conductive films are partly converted to sulfides of said metal by exposing them to sulfur vapor.

7. A method as defined in claim 6 wherein said metal layers are deposited upon said electroluminescent layers by vapor deposition to produce a film having a thickness between 5 angstrom units and 1 micron thereon.

8. A method as defined in claim 7 wherein said metal layers have a thickness between substantially 20 and 80 angstrom units.

9. A method as defined in claim 5 wherein said films have a respective thickness between substantially 2 and 25 microns and said layers of electroluminescent material have a thickness between susbtantially 0.01 and 5 microns.

10. An electroluminescent body comprising a stack of metallic zinc films with a structure characteristic of vapor deposition and having surfaces characteristic of a sulfurizing treatment of the respective metallic films forming intervening layers of electroluminescent material between said films.

11. An electroluminescent body, comprising a stack of metallic zinc films with a structure characteristic of vapor deposition and having surfaces characteristic of a sulfurizing treatment of the respective metallic films forming intervening layers of electroluminescent material between said films, said layers of electroluminescent material being further provided with respective activating layers of a metal selected from the group which consists of silver and copper.

12. An electroluminescent body, comprising a stack of metallic zinc films with a structure characteristic of vapor deposition and having respective thicknesses between substantially 5 and 10 microns and provided with surfaces characteristic of a sulfurizing treatment of the respective metallic films forming intervening layers of electroluminescent material with respective thicknesses of substantially 0.01 and 5 microns between said films, said layers of electroluminescent material being further provided with respective activating layers of a metal selected from the group which consists of silver and copper, said activating layers having respective thicknesses of substantially 20 to 80 angstrom units.

References Cited by the Examiner
UNITED STATES PATENTS

| | | | |
|---|---|---|---|
| 2,734,872 | 2/1956 | Young | 252—301.6 |
| 2,819,420 | 1/1958 | Koller | 313—108 |
| 2,936,252 | 5/1960 | Hanlet | 313—108 |

JAMES W. LAWRENCE, *Primary Examiner.*

R. JUDD, *Assistant Examiner.*